United States Patent [19]
Solaroli

[11] 3,863,350
[45] Feb. 4, 1975

[54] GAUGE PROVIDED WITH A RAPID AND AUTOMATIC ZERO-SETTING DEVICE

[75] Inventor: Sergio Solaroli, Bologna, Italy

[73] Assignee: Finike Italiana Marposs-Soc. In Accomandita Semplice de Mario Possati & C., Bentivoglio (Bologna), Italy

[22] Filed: Aug. 31, 1973

[21] Appl. No.: 393,477

[30] Foreign Application Priority Data
Sept. 15, 1972 Italy.................................. 3534/72

[52] U.S. Cl............................. 33/169 R, 33/172 E
[51] Int. Cl. .............................................. G01b 5/00
[58] Field of Search .......... 33/148 H, 169 R, 172 E, 33/170

[56] References Cited
UNITED STATES PATENTS

| | | | |
|---|---|---|---|
| 1,835,807 | 12/1931 | Parker............................. | 33/172 E |
| 2,007,840 | 7/1935 | Terry................................ | 33/148 H |
| 2,065,951 | 12/1936 | Terry................................ | 33/148 H |
| 2,396,383 | 3/1946 | Moore.............................. | 33/172 E |
| 2,419,461 | 4/1947 | Neff.................................. | 33/148 H |

Primary Examiner—Harry N. Haroian
Attorney, Agent, or Firm—Stevens, Davis, Miller & Mosher

[57] ABSTRACT

A gauge for measuring work pieces which comprises a supporting frame, having a reference block and seats for the work pieces mounted thereon and a measuring head comprising a feeler and position transducer positioned on a support plate which also has fixed thereto an adjustable control element contactable with the reference block.

7 Claims, 1 Drawing Figure

PATENTED FEB 4 1975 3,863,350
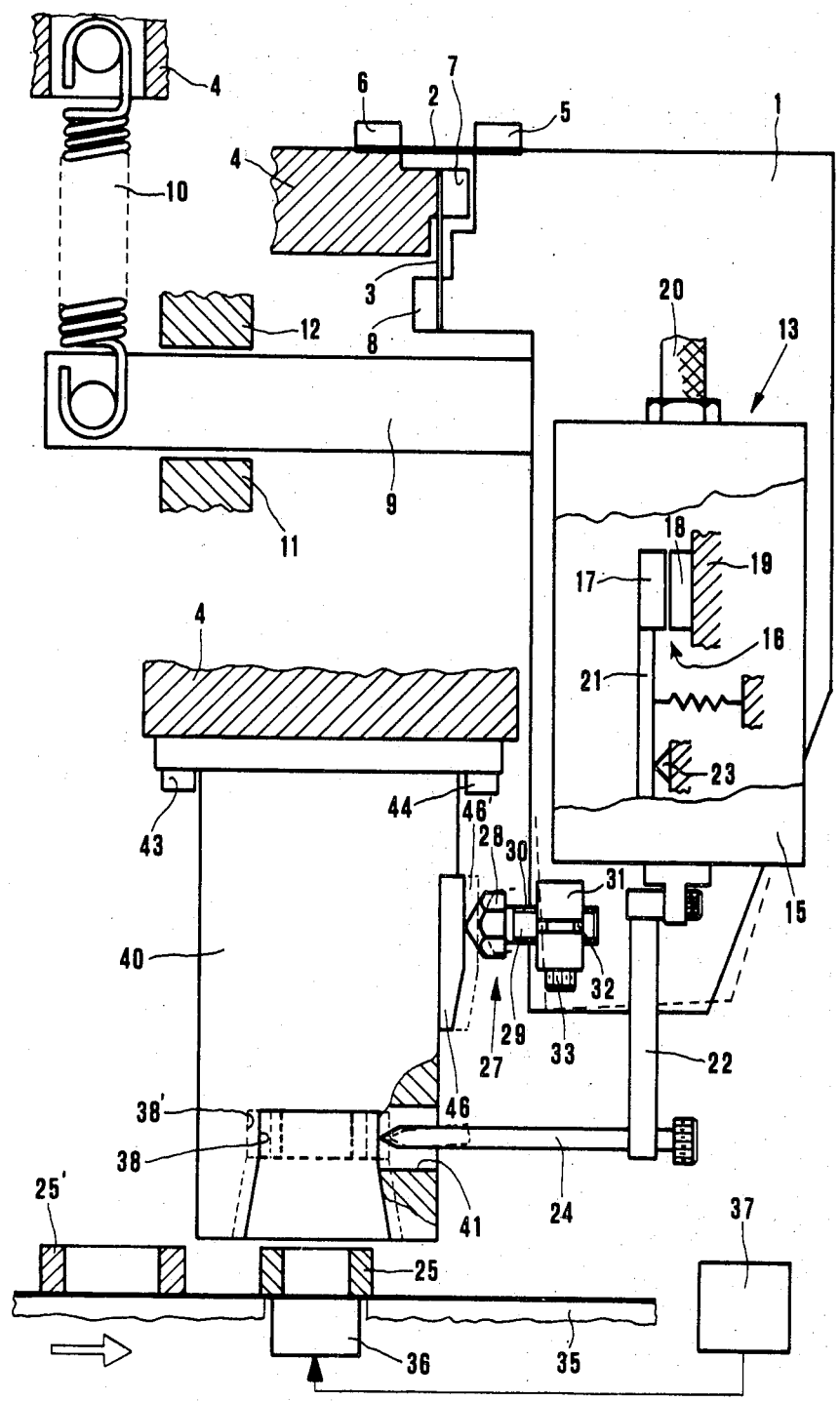

GAUGE PROVIDED WITH A RAPID AND AUTOMATIC ZERO-SETTING DEVICE

The present invention relates to a gauge, in particular to a comparator with direct contact feelers to check mechanical pieces provided with a device having replaceable elements and permitting a rapid and automatic mechanical zero-setting of the gauge itself.

It is known that gauges with direct contact feelers include moving elements with which feelers contacting the pieces to be gauged are associated.

The movements of feelers are detected by position transducers which provide indications with reference to the sizes of masters.

The mechanical zero-setting of these gauges consist in regulating the position of feelers and transducers so that when the former contact the master, the latter are in a position about which a repeatable preferably linear response is obtained with good sensitivity.

After the mechanical zero-setting, the electric zero-setting is operated, consisting in setting, by potentiometer means or the like, the reading index of the gauge to zero, while the feelers still contact the master.

It is clear that the mechanical zero-setting of gauges is a very delicate operation which often takes a lot of time.

It also is clear that an incorrect mechanical zerosetting makes the precision of the gauge quite illusory.

Therefore, precision depends on the skill and care of the operator, which is not sufficiently reliable.

The technical problem the present invention intends to solve is to provide a gauge in which the mechanical zero-setting can be quickly carried out accurately and reliably, depending only on the manufacturing factors and not on the action of the gauge operator.

This problem is solved by a gauge having at least one measuring head comprising a feeler and a position transducer. According to the present invention, the measuring head is associated with the frame of the gauge through supporting means apt to allow its movements with respect to the frame itself, the measuring head being associated with contact elements apt to cooperate with reference means connected with said frame. The reference means are replaceable in order to obtain the mechanical zerosetting according to the nominal size changes of the pieces to be gauged.

The following description relates to a preferred embodiment of the present invention, given by way of illustration and not of limitation with the aid of the enclosed drawing representing a schematic view of a gauge falling within the present invention, which can be used to check mechanical pieces on automatic measuring machines.

With reference to the FIGURE, a supporting plate 1 is pivoted by means of two flat springs 2, 3 on the frame 4 of the gauge. One end of spring 2 is tightly fixed to supporting plate 1 through block 5, while the other end is fixed to frame 4 through block 6.

Spring 3, which in the rest position lies orthogonally with respect to the other spring 2, has an end fixed to frame 4 through block 7, whereas its opposite end is tightly fixed to plate 1 through block 8.

To supporting plate 1 there is fixed an arm 9, to which an end of return spring 10 is connected and whose other end is connected with frame 4.

The movement of arm 9 is limited by two surfaces 11 and 12, associated with the frame 4 of the gauge.

Moreover, to plate 1 there is fixed a measuring head 13 apt to detect the sizes of pieces to be gauged.

Head 13 is formed by a shell 15 in which there are size detecting devices. They generally include a transducer 16 of an inductive type provided with a mobile element 17 and with an element 18 tightly fixed to support 19 integral with shell 15.

The winding of the transducer is fed from outside by means of a cable 20.

Element 17 is fixed to a rod 21 connected in turn to arm 22 which carries feeler 24.

Feeler 24 is brought into touch with pieces 25, 25' to be gauged as a result of the rotation of shaft 21 and of arm 22 around fulcrum 23 supported by shell 15.

The mechanical displacements of feeler 24 are detected by transducer 16 and converted into corresponding electric signals.

Moreover with plate 1 there is connected a reference device 27.

Reference device 27 is formed by a point 28 associated with a shaft 29 which, by means of a thread 30 permitting its regulation, can be screwed in a support 31 rigidly fixed to plate 1.

On support 31 there is a notching 32 which permits, through screw 33, the strain of support 31 and the following locking of shaft 29 and therefore of point 28.

In the example shown by the FIGURE, the pieces 25 to be gauged are bearing rings placed on a step moving conveyor belt 35.

Every piece 25 is brought to a measuring position by operating a supporting pin 36 controlled by a unit 37 known per se.

As a matter of fact, pin 36, operated in such a way, pushes up piece 25 and positions it in a seat 38 obtained in a replaceable support 40 rigidly fixed to frame 4 of the gauge, through screws 43, 44.

In support 40 in correspondence to seat 38 there is a hole 41 permitting the passage of feeler 24 in order to carry out the required size gauging on piece 25.

Moreover, with support 40 there is connected a block 46 of a very hard material, which forms a reference for point 28. The pressure of point 28 on block 46 is ensured by spring 10. The gauge works as follows.

An initial mechanical zero-setting is made while a master 25 is in a gauging position, i.e. placed in seat 38 and kept in this position by pin 36 by adjusting point 28 on reference 46 so as to bring about an advisable rotation of plate 1 and then relative displacing armatures 17, 18 of transducer 16, while feeler 24 is still against piece 25, until the mechanical zerosetting is obtained.

Then by means of known devices the electric zero-setting is made, which can be visualized on a per se known indicator instrument not shown in the FIGURE.

After setting this reference condition, i.e. after the measuring head and the reading instrument have been set to zero on a master, the sizes of the succeeding pieces to be checked are detected as displacements with respect to zero.

If it is required to gauge the diameter of a set of pieces 25' having a different nominal size, for instance greater than that of piece 25, support 40 must be replaced by another of the same type, having a seat 38' apt to house the new pieces 25' and a block 46' of such a thickness as to rotate plate 1 so that, while feeler 24 is contacting the new piece 25', elements 17, 18 of transducer 16 are still at the optimum zero-setting distance.

So the mechanical zero-setting is automatically achieved by replacing support 40 and its accuracy only depends on manufacturing features.

It is clear that the above-described gauge can undergo variants and equivalent changes from a structural and functional viewpoint, without falling outside the scope of the present invention. For example, the gauge can include several measuring heads, each one of which can have many a feeler, which can make the use of seats for positioning the pieces to be checked quite unnecessary. Support 40 can be fixed to frame 4 by locking means different from screws 43, 44, for instance through release joints. Plate 1 supporting head 13 can be made so as to be movable by translation (e.g. by means of cylindrical guides), instead of being movable by rotation.

What is claimed is:

1. A measuring apparatus for measuring dimensions of workpieces comprising:
    a frame; connecting means; a support carried by the frame through said connecting means which permit movements of the support relative to the frame; a measuring head mounted on the support and comprising a measuring arm adapted to cooperate with the workpiece to be measured and movable in the head toward and away from the workpiece; detecting means mounted in the head for measuring the position of the arm in the head; said connecting means permitting movement of said support together with said measuring head toward and away from the workpiece; first mechanical reference means fixed on said support and second mechanical reference means fixed on said frame adapted to cooperate with said first mechanical reference means for displacing said support together with said head in a defined position for the measurement of workpieces having a determined nominal dimension, this position corresponding to the head zerosetting; at least one of said first and second mechanical reference means being replaceable by similar reference means having a different determined dimension for achieving automatically the zero-setting of the measuring head, when measuring workpieces having a different determined nominal dimension.

2. The measuring apparatus according to claim 1, wherein said connecting means comprises pivot means permitting pivotal movements of said support and measuring head relative to said frame.

3. The measuring apparatus according to claim 1, wherein said first mechanical reference means comprises a contact point adjustably fixed on said support, said point being adapted to contact said second mechanical reference means.

4. The measuring appearatus according to claim 1, wherein said second mechanical reference means comprises a block of a determined thickness adapted to cooperate with said first mechanical reference means, and replaceable by similar second mechanical reference means having a block of determined different thickness for achieving automatically a new zero-setting of the measuring head.

5. The measuring apparatus according to claim 1, wherein said second mechanical reference means is replaceably fixed on said frame, and comprises a member defining a seat for positioning the workpieces having a determined nominal dimension in a determined position on the frame.

6. The apparatus according to claim 5, wherein said member defines holes in said seat for the passage of a feeler mounted at one end of said measuring arm.

7. The measuring apparatus according to claim 5, wherein on said member there is fixed a block of determined thickness and adapted to cooperate with said first mechanical reference means for achieving automatically the zero-setting of the measuring head when measuring workpieces having a determined nominal dimension.

* * * * *